April 27, 1937.  O. H. SMITH  2,078,422
LAMINATED INSULATION MATERIAL
Filed June 29, 1934
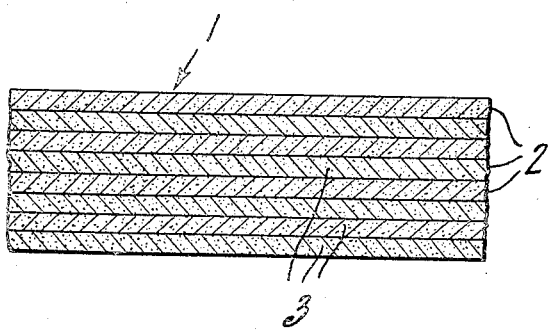
INVENTOR
OMAR H. SMITH
BY
ATTORNEY Patented Apr. 27, 1937

2,078,422

UNITED STATES PATENT OFFICE 2,078,422

LAMINATED INSULATION MATERIAL

Omar H. Smith, West Englewood, N. J., assignor, by mesne assignments, to United States Rubber Company, New York, N. Y., a corporation of New Jersey Application June 29, 1934, Serial No. 733,029

3 Claims. (Cl. 154—2.6)

This invention relates to a laminated insulation material, more particularly to a laminated material formed of fibers and meta styrol.

In the electrical art, and more particularly in the radio industry, extensive use is made of sheet insulation of the type which can be punched to form various insulating parts. These laminated materials are usually made by treating laminae of paper, cloth or other fibrous materials with an insulating compound, the one most commonly employed being partially condensed phenol-formaldehyde condensation products, after which the laminae are consolidated under pressure and heat. The electrical and physical properties of such laminated fiber and phenol-formaldehyde condensation products vary widely, this being due at least in part to the fact that it is necessary to bake the impregnated material to further condense or set the phenol-formaldehyde condensation product, and variations in the time and degree of heating will cause variations in the properties of the finished product. Moreover, such laminated materials made with phenol-formaldehyde condensation products do not have the desired low electrical loss which in certain fields is essential, particularly where they are to be used in high frequency radio work. In fact, the best of such materials now available have a loss factor on the order of about 20, and are liable to deterioration and ultimate failure when used in connection with high radio frequency circuits, such as frequencies above 1500 kilocycles per second.

An object of the present invention is to provide an improved laminated material.

Another object is to provide a laminated insulation material exhibiting an exceptionally low electrical loss when applied to electronic devices, and capable of withstanding high radio frequencies without deterioration.

Another object is to provide a laminated insulation material which can be readily punched and otherwise manipulated in manufacturing processes.

A further object is to provide a laminated insulating material which does not require to be baked in the finishing process and which can be made without the use of inflammable solvents.

Other objects will appear from the detailed specification and claims.

In the drawing the figure shows in vertical section and on an enlarged scale a laminated material made according to the invention.

Pure meta styrol is a good insulator but it cannot be punched satisfactorily in making insulating articles from sheet stock. By "meta styrol" is meant polymerized styrol, the term "meta styrol" being commonly applied to polymerized styrol in the art. By adding plasticizers, the meta styrol can be punched but in this case it does not resist compression satisfactorily.

In the present invention sheets of paper, cloth and other suitable fibrous materials may be impregnated with a solution of meta styrol in an organic solvent, and after drying the sheet stock may be plied up in the desired number and pressed under heat to consolidate the sheets.

In carrying out the invention, paper or textile material which is to be impregnated should first be dried as by heating in an oven. The sheet material is then passed through a solution of meta styrol, the solvent removed and the sheets plied up and molded under heat and pressure. If desired, plasticizers may be added to the meta styrol. In order to reduce the moisture content of the paper or textile material to a minimum, the dried paper may be passed through a hot wax such as paraffin or Halowax (chlorinated naphthalene) or a hot mineral oil of the type used medicinally. This treatment serves to remove the last traces of moisture, and in addition the waxes or oils in limited amounts act as plasticizers for the meta styrol. Any excess of the oil or wax is squeezed out during the molding operation.

The laminated insulating materials made according to the method of this invention are unique, in that they are characterized by an electrical loss factor of substantially less than 5, and usually of approximately 1, measured at a frequency of one kilocycle. They are further characterized by the fact that their dielectric properties and performance actually improve at the higher radio frequencies; whereas it is well known that the phenol-aldehyde materials now generally used exhibit a relatively high loss factor at low frequencies, which becomes even greater at the higher frequencies, and that at high radio frequencies they undergo progressive deterioration.

In the drawing there is shown in vertical section an embodiment of the invention, in which the laminated material as a whole is designated by the numeral 1, while 2 designates laminae of paper and 3 the meta styrol incorporated in and between the laminae.

As specific examples of the invention, the following are given, the loss factor stated in these examples being the product of the dielectric constant and the power factor in percent. All figures on the dielectric constant and power loss were measured at a frequency of one kilocycle.

*Example 1*

A sheet of paper of the type commonly employed for laminated sheet insulating purposes was heated in an oven until the excess moisture was expelled. It was then dipped once in a 5% solution of meta styrol in carbontetrachloride, the bulk of the solvent expelled by air drying, and then given two more dips in a 10% solution of meta styrol with air drying between the dips. While the brittle form of meta styrol may be used, it is preferred to use the tough or alpha form of polymer. The purpose in using a more dilute solution of meta styrol for the first dip is to secure a deeper impregnation. After the final dip the impregnated paper was heated in an oven to completely expel the solvent, after which it was cut into pieces, the pieces plied up and pressed together for five minutes in a hot mold, eight pieces being plied up in this specific example. A steam pressure of 50 lbs. (corresponding to a temperature of 146° C.) and a hydraulic pressure of 300 lbs. per sq. in. were employed in the pressing operation. The product was a compact sheet which could be cut and punched readily and otherwise treated by the usual manufacturing processes. The final product contained approximately 60% meta styrol and 40% paper. When tested, it had a power factor of 0.4% and a dielectric constant of 2.75. The loss factor was 1.1.

As compared with the above material, a sample of the usual best quality open market laminated punching insulation impregnated with a phenol-formaldehyde condensation product was tested in a similar manner. It had a power factor of 3.5% and a dielectric constant of 5.4, or a loss factor of 18.9. In other words, the best grade of usual laminated insulation obtained on the market had an electrical loss over seventeen times greater than that of the meta styrol laminated insulation.

*Example 2*

In this example substantially complete drying of the paper was obtained by drawing it through mineral oil heated to 150° C. The excess oil was removed by passing the impregnated paper through pressure rolls, and the paper was then given two dips in meta styrol solution, the first dip in a 5% solution and the second one in a 10% solution, with suitable drying between dips. The impregnated sample was air dried and then oven dried, after which six pieces were plied together by the method described in the first example. The sample had a power factor of 0.4% and a dielectric constant of 2.6%, or a loss factor of 1.04.

*Example 3*

Paper was dried as usual and then dipped once in a 5% solution of meta styrol in carbontetrachloride, after which the sample was oven dried until all solvent was expelled. Eight pieces of this paper were stacked with a small amount of dry meta styrol powder sprinkled between successive layers, after which the material was pressed under heat in the usual manner. A compact sheet with excellent physical properties was obtained. The dielectric constant was 2.9 and the power factor 0.4%, or the loss factor was 1.16.

*Example 4*

In this example a sample was prepared in the usual manner by impregnating paper with an 8% meta styrol solution containing 15% dibutyl phthalate (based on the dry weight of meta styrol). The sample was dried and molded in the usual manner. It had a dielectric constant of 3.02 and a power factor of 1.1%, or a loss factor of 3.32.

*Example 5*

Paper was impregnated by dipping it twice in a 10% solution of meta styrol containing seven parts of vaseline to 100 parts of meta styrol. The impregnated paper was dried and plied together as usual. It had a power factor of .38% and a dielectric constant of 2.8, or the loss factor was 1.06.

It will be seen that by the invention a laminated electric insulation material has been provided of superior characteristics. It can readily be punched and worked in the usual manner, it can be made into laminated tubes, and its electrical properties are vastly superior to the previously commonly used laminated insulation containing phenol-formaldehyde condensation products, the test in Example 1 showing an electrical loss less than one seventeenth that of a best grade present commercial product. It will be appreciated that the art of insulating high radio frequency circuits and devices may be revolutionized by the present invention. The material does not require to be baked in the finishing operation but merely pressed under sufficient heat to compact the laminae. It has superior strength and toughness and also superior resistance to chemical reagents.

In addition to its use for electrical work and particularly for high frequency radio work, it is capable of general use in the manufacture of tubes, gears, gaskets, etc., which are substantially not affected by water, acids, alkalies, oils, grease, etc.

Having thus described my invention, what I claim and desire to protect by Letters Patent is:

1. A method of making insulating material which comprises drying laminae of fibrous material, impregnating them with a dilute solution of meta styrol, drying, then impregnating with a more concentrated solution of meta styrol, drying, superposing the laminae and pressing them together under heat.

2. The method of making laminated insulating material which comprises drawing laminae of paper through heated mineral oil, removing excess oil by pressure, impregnating the laminae with successive meta styrol solutions with drying between impregnations, drying after the final impregnation, superposing the laminae and pressing them together under heat.

3. A method of making laminated insulating material which comprises drying sheets of paper, treating the sheets by successive impregnations with solutions of tough meta styrol of increasing concentration, removing solvent between impregnations, superposing the sheets, and consolidating the composite body by heat and pressure.

OMAR H. SMITH.